Patented May 5, 1936

2,039,409

UNITED STATES PATENT OFFICE 2,039,409

EGG MATERIAL

Benjamin R. Harris and Marvin C. Reynolds, Chicago, Ill.

No Drawing. Application September 26, 1934, Serial No. 745,528

20 Claims. (Cl. 99—196)

Our invention relates to an improved egg material together with the use of such improved egg material.

The principal object of our invention is the provision of an egg material having improved properties as an emulsifying agent and general interface modifier.

Another object is the provision of an egg material particularly adapted for use in the preparation of an improved cake batter and an improved cake.

Another object is to improve egg materials by the incorporation therewith of a class of colloidal substances which have the property of improving the egg material in many respects and of enhancing the natural advantageous properties of the egg materials in the foods and other industries.

Other objects and features of the invention will appear as the description progresses.

In our prior co-pending application Serial No. 706,292, filed January 11, 1934, now Patent No. 2,026,631 we disclose the use in egg material such as whole eggs, egg yolks, egg whites, or various mixtures thereof, of a class of hydrophillic substances which we termed hydrophillic lipins and which were characterized by the presence in the molecule of a lipophile group such as a fatty acid radical of relatively high molecular weight and a hydrophile group consisting of one or more unesterified hydroxy groups. We have discovered that egg substances may be greatly improved, particularly for use for certain purposes by the incorporation therewith of chemical substances similar in many respects to the hydrophillic lipins described in our copending application, but modified insofar as the hydrophile group is concerned in general to inrcease the hydrophillic character in any particular case. The class of substances which we now describe for use in egg materials are similar to those described in Harris Patent No. 1,917,256. The substances described in this patent, however, all have antispattering effect when employed in margarine. The substances used in accordance with the present invention do not require such a state of balance in the molecule as to function suitably as anti-spattering agents. Our present substances, therefore, may be considered also as hydrophillic lipins in which a hydrogen of at least one hydroxy group is replaced by a hydrophillic radical such as, for example, a sulphate group, a phosphate group, a sulphonic acid derivative, or a nitrogeneous hydrophillic group such as a betaine radical. This class of substances will be described more in detail hereinafter.

Generally speaking, whole eggs contain about one-third of yolks and two thirds of whites. The yolk material contains about 50% of moisture and 50% of solids, while the white contains about 12½% of solids and the rest is moisture. The solid material of whole eggs is composed of various types of proteins having various properties as well as small amounts of lecithin and fats. The white contains a complex albumen substance with traces of sugar. In its normal state, the moisture in the egg is partially bound with the solids and partially in a free state.

On freezing egg material, such as mixed eggs or yolks, and then thawing them out, clumping takes place and a portion of the liquid oozes out. The egg material at the same time suffers a change in its colloidal properties.

We have discovered that by adding the hydrophillic materials of the character described above to egg material, the colloidal properties of the egg material are altered, the surface tension characteristics of the egg material are modified, and a product is produced having radically modified viscosity, improved emulsifying value, and, in general, other advantages when employed as an emulsifying or similar agent. For instance, a cake batter emulsion is greatly improved by incorporation therewith of egg materials produced in accordance with our present invention. As a result of this improvement, an improved cake is produced having better texture and improved grain and superior keeping qualities. When eggs made in accordance with the present invention are employed in a cake batter, the amount of aqueous materials can be greatly increased as well as water soluble materials such as sugar. This results in a richer cake with a greater moisture content, and this increased moisture content is also of advantage in reducing staling. While the egg material of our invention has great advantage in improving cake batters and cakes, it is by no means limited to use in this respect, but is of advantage in substantially every case in which eggs or egg materials are used for their emulsifying and colloidal properties.

The egg material of our present invention also has the advantage that when frozen and kept in a frozen condition until ready for use and then thawed out, it will be more viscous and the separation of free moisture therefrom will be greatly reduced. Yolks and whole eggs thaw out perfectly smooth and free of lumps and curds, while untreated yolks or whole eggs when frozen and thawed become denatured, coagulated and curdy. If our invention is applied to whites alone, the product after freezing and thawing is much less viscous, but has a much greater emulsifying action than fresh egg whites.

The manner of incorporation of the hydrophillic substances used in accordance with our present invention may be modified in many ways. Those hydrophillic substances which are liquid at ordinary temperatures are readily incorporated into egg material by simple mixing, taking precautions that a uniform distribution of the hydrophillic material in egg material is obtained. Those hydrophillic substances which are plastic or semi-solid may be emulsified with an aqueous material such as water to form a paste, and the paste incorporated into the egg material by a mechanical mixing operation. Certain advantages in distribution are obtained by adding the egg material to the paste with continuous stirring or rubbing, by the use of a colloidal mill, or any suitable mixing apparatus. Those hydrophillic substances which are substantially solid at room temperatures may also be incorporated in egg material either by forming a paste or by grinding the hydrophillic substance together with a portion of the egg material, and subsequently dispersing the resulting product into the remainder of the egg material by suitable mixing apparatus.

The liquid emulsion of egg material and hydrophillic substance may be used immediately after mixing. The product, however, may be frozen and kept in a frozen condition below the temperature of decomposition until ready for use. The product on thawing possesses valuable emulsifying properties and is substantially homogeneous in that very little or no free moisture separates out.

When the hydrophillic substance is added to egg whites, it is preferable to make a paste by adding the egg whites to the hydrophillic lipin gradually with constant stirring. Since the egg whites do not foam as much during agitation as normally when the hydrophillic substance is incorporated therewith, the mixing operation is simplified.

We shall first consider the substances used in accordance with the present invention as derivatives of substances having free hydroxy groups such, for example, as substances described in our co-pending application. Such substances are in general hydrophillic lipins wherein a hydrogen of at least one hydroxy group is replaced by a sulfate, phosphate, sulphonic acid derivative, or a hydrophillic nitrogenous group. In general, the sulphates, phosphates, sulphonic acid derivatives, or the hydrophillic nitrogenous group are more hydrophillic in character than the free hydroxy groups and in general the resulting substances are somewhat more hydrophillic than the corresponding hydroxy substances. Each of these substances has both a lipophile and hydrophile group in the molecule; the lipophile group, as previously noted, being a group having a definite affinity for oils and fats; and the hydrophile group comprising essentially at least one sulphate, phosphate, sulphonic acid or nitrogenous radical, or the salts thereof.

The sulphate substances which we employ are esters of sulphuric acid in which the esterification takes place preferably through a terminal hydroxy radical attached to a lipophile group. One example is the direct esterification of a relatively high molecular weight alcohol by sulphuric acid, in which substances like cetyl sulphate, having the general formula $ROSO_3H$, are produced. The sulphates may also be esters of derivatives of polyhydroxy substances having a lipophile group. For example, esters or ethers of glycerine having a relatively high molecular weight lipophile group and at least one free hydroxy group may be treated with sulphuric acid to esterify a remaining hydroxy group and produce substances adapted for use in our present invention. As an example, monostearine may be esterified with sulphuric acid to produce monostearine sulphate (sodium salt) which can be employed satisfactorily in our present invention.

As an example of one manner of producing a hydrophillic lipin having a sulphate group, a free fatty acid such as stearic acid, palmitic acid, or lauric acid, or mixtures of various fatty acids, is mixed with glycerine in excess of the amount calculated to produce the mono-ester, and the mass heated together at approximately 220° C. with agitation for four hours, in a non-oxidizing atmosphere, either by bubbling an inert gas through the mixture or by heating in a vacuum under a reflux condenser; in any case, the moisture formed during the esterification must be allowed to escape from the reaction mixture. This produces substantially a fatty acid mono-ester of glycerine, which, after drawing off the excess glycerine, is then intimately mixed with sulphuric acid at room temperature, and allowed to react until a sulphuric acid ester is formed at a hydroxy group. In the case of relatively high molecular weight saturated fatty acids, like stearic acid, 2 to 3 parts by weight of sulphuric acid may be mixed with the mono-ester, and allowed to stand for about fifteen hours. When unsaturated lipophile groups are present, care must be taken that the sulphuric acid group be attached at a hydroxy group of the glycerine rather than at the double bond. The final sulphate substance is washed thoroughly and preferably is neutralized to form the sodium salt. In place of sulphuric acid, sulphur trioxide, chlorsulphonic acid, sulphuryl chloride, or other "sulphonating" agents maye be employed, under appropriate conditions, to produce the sulphate esters.

According to another example, a naturally occurring triglyceride, such as cotton seed oil, may be treated with a proportion of glycerine, preferably in the presence of a catalyst, and at elevated temperature to cause a re-esterification resulting in the formation of essentially a mixture of mono- and di-glycerides of the fatty acids present. The mixture of mono- and di-esters may then be treated with chlorsulphonic acid, or some other "sulphonating" agent to form a mixture of sulphuric acid esters. The conditions should be such that "sulphonation" will preferably not occur at the double bonds, assuming double bonds to be present, such as the use of low temperatures, for example below 0° C. The sulphonated product is washed with brine and neutralized. The oil or fat employed may be hydrogenated completely or in part, or it may be employed without having been hydrogenated.

A substance very suitable for our purpose is a mixture of polyglycerol mono- or di-esters, sulfated at one or more hydroxy groups to increase the hydrophillic character of the substance. As an example of the preparation of this class of material, we add about 1% of an alkali catalyst to water-free glycerine, and heat the same at about 260° C. with agitation and in an inert atmosphere for approximately four to four and one-half hours, by bubbling an inert gas through the mixture or by heating in vacuum under a reflux condenser. This produces a mixture of polyglycerols which may then be esterified with fatty acids to form polyglycerol esters having free OH groups. The latter substances are then treated with sulphuric acid, or other "sulphonating" agent, to esterify one or more of said OH groups, thereby forming a material which, after purification and neutralization with an alkali to form an innocuous salt, may be used in our invention for the incorporation into egg material to increase the ratio of liquid present in a flour batter.

According to one example, 60 parts of hydrogenated cottonseed oil (melting at approximately 102° F.) are mixed with 40 parts of polyglycerols prepared as described above, together with .06 part of caustic soda as a catalyst. The entire mixture is heated to about 250° C., with stirring and in the absence of air, for about two hours. This product is then allowed to cool and settle, and is found to be a mixture of polyglycerol esters having free OH groups. The small underlying layer of excess polyglycerol is drawn off and discarded. This mixture is then washed by dispersing it in hot water and salting it out with 3% of sodium chloride. This washing procedure is repeated twice and the product is finally dried. 500 parts of this dried product are chilled with solid $CO_2$ in a dough type of mixer, and treated slowly with 150 parts of chlorsulphonic acid. During the entire sulphonation, the mixture is thoroughly and continuously mixed and the temperature is maintained at about −10° C. When all of the chlorsulphonic acid is in, the mixture is hydrated by mixing in finely crushed ice and neutralized with aqueous caustic soda solution. This product may be further purified by dispersing it in hot water and salting out with sodium chloride. The paste thus obtained may be incorporated in egg whites, whole eggs or yolk material. The product is rather freely dispersible in water, and functions at the water-oil interface of an emulsion to stabilize the same and consists to a large extent of substances comprising a fatty acid radical linked to a hydrophile sulphate radical by means of a radical derived from an organic polyhydroxy substance.

Similar substances may be made by means of the same general method, employing polygylcerides prepared as above, with other oils, fats, waxes, fatty acids, and other fatty materials. Examples of such materials are corn oil, leaf lard, oleostearine, stearic acid, hydrogenated oils, palm oil and the like. In each case, the proportions employed may be modified somewhat, and time and temperature changed, if necessary, to suit conditions.

The glycerol derivatives have been referred to in the previous paragraph by way of example. They are, in general either ethers or esters of glycerine (or polyglycerols) having lipophile groups and sulphate hydrophile groups. It is, of course, understood that any polyhydroxy substance may be employed under suitable conditions in place of glycerine to produce similar substances adapted for use in the present invention, as, for example, glycols, polyglycols, hydroxy carboxylic acids, sugars, and sugar alcohols.

The prior co-pending application of Harris, Serial No. 706,292, filed January 11, 1934, now Patent No. 2,026,631, discloses certain hydrophillic lipin substances wherein the hydrophillic character is imparted to the material by a hydroxy group or groups. The substances there disclosed have hydrophillic properties and are of great utility when employed as directed in such application. We have found that by substituting another group such as a sulphate radical for at least one hydroxyl group in the substances disclosed in such application, greater hydrophillic character is imparted to the materials and improved hydrophillic properties are obtained. All of these substances are valuable as addition products in egg material. Many of the substances here described therefore are in the nature of hydroxy hydrophillic lipins wherein at least one hydroxy group is esterified with, for example, a sulphate radical.

The phosphate substances which we employ are substantially identical with the sulphate substances described hereinabove with the exception that a hydrophile phosphate group is substituted in place of a sulphate group. In other words, a hydrophile phosphoric acid ester of any of the hydroxy substances disclosed above can be employed in place of a hydrophile sulphuric acid ester. Examples are phosphoric acid esters of relatively high molecular weight alcohols such as lauryl, cetyl, and octodecyl alcohols; phosphoric acid esters of derivatives of polyhydroxy substances having a lipophile group and at least one hydroxy group, such as monostearine phosphate, stearyl diethylene glycol phosphate, lauryl glyceryl ether phosphate, and the like.

The phosphate substances which we employ may be anti-spatterers of the character described in the prior patent of Harris, No. 1,917,259, or they may have lipophile and hydrophile groups which are insufficiently "balanced" to prevent spattering. The important characteristics of the phosphate substances is that they have a lipophile group of relatively high molecular weight, having at least eight carbon atoms, as the examples illustrate, and a hydrophile group consisting essentially of the phosphate group. The lipophile group and phosphate group may be directly joined as in a simple monatomic alcohol ester, or the residue of a polyhydroxy compound may comprise a linkage, such polyhydroxy compounds being polyhydric alcohols, isomers or polymers thereof, sugars, hydroxy carboxylic acids, sugar alcohols, and the like. The phosphates employed may be pure substances or they may be mixtures, such as those formed by re-esterifying a natural oil with an excess of glycerine or polyglycerols, and forming hydrophile phosphate esters of the resulting substances.

The hydrophillic lipin phosphates which are useful for the purposes of our invention, may be prepared in various ways, some examples of which are as follows:

1. Reacting phosphorus pentoxide, phosphorus oxychloride, phosphorus pentachloride with a hydroxy group of a more or less lipophile molecule, in the presence of a solvent or condensing agent when required, to produce a hydrophile organic phosphate.

2. Reacting a phosphate of water soluble polyhydroxy substances, such as glycerophosphates, glycol phosphates, dextrose phosphates, etc., with fatty acid chlorides such as lauryl chloride, oleyl chloride, stearyl chloride and the like, in the presence of a solvent or condensing agent.

3. Re-esterifying a more or less lipophile molecule having a hydroxy group, with ethyl metaphosphate.

We list below a number of additional illustrative examples of substances with esterifiable hydroxy groups to which we impart additional hydrophillic properties by introducing therein a sulphate, phosphate, nitrogenous, or sulphonic acid radical, in order to produce materials useful for the purposes of the invention herein disclosed:

 Octyl Alcohol

 Dodecyl Alcohol

 Hexadecyl Alcohol

 Cholesterol

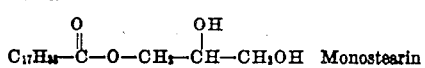 Monostearin

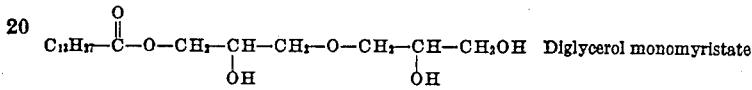 Diglycerol monomyristate

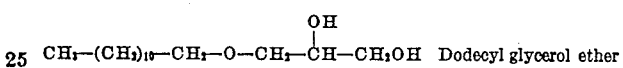 Dodecyl glycerol ether

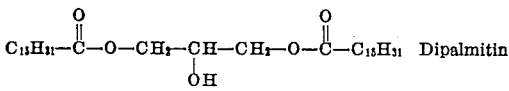 Dipalmitin

 Octodecyl diethylene glycol ether

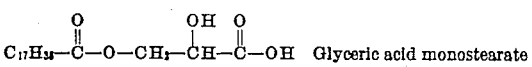 Glyceric acid monostearate

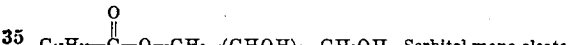 Sorbitol mono-oleate

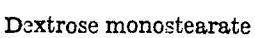

While the examples are single substances, it is to be understood that in practice, we find it much more convenient, in general, to employ mixtures, some of the more important of which we describe herein.

The sulphonic acid substances which I employ are similar in many respects to the sulphate and phosphate substances, particularly in their structure and physical-chemical characteristics. They have at least one lipophile radical and hydrophile radical, the latter portion of the molecule consisting primarily of the sulphonic acid group. Among such substances are alkyl sulphonic acids having the general composition $RSO_2OX$, wherein R is an alkyl radical having at least four carbon atoms, and X is a cation such as hydrogen, sodium, calcium, ammonium, or the like. Sulphonic acid derivatives may also be used such as esters of relatively low molecular weight sulphonic acids and a polyhydroxy substance having a lipophile radical.

Some sulphonic acid derivatives which we employ may be considered as compounds in which sulphonic acid radicals are substituted for hydroxy groups, in the same manner and in the same type of substances as described above in connection with the sulphates and phosphates. Such a substance may be formed by the esterification of a sulphonic acid derivative of a low molecular weight carboxylic acid with a relatively high molecular weight alcohol, producing a final product like cetyl sulpho-acetate (neutralized to form the sodium salt). I may also employ derivatives of sulphonic acids which comprise essentially polyhydroxy substances having a lipophile group replacing at least one hydroxy radical, and a low molecular weight sulphonic acid esterified at a second hydroxy radical. Examples of substances of this character are palmityl trimethylene glycol sulphoacetate, monolauryl glycerol sulphoproprionate, and the like. Other examples of sulphonic acid derivatives which can be employed are set forth in Harris Patent No. 1,917,260.

Some of the nitrogenous substances which we employ in accordance with the present invention may also be considered as substances wherein the hydrogen of at least one hydroxy group is replaced by a nitrogenous group such as a betaine radical. Examples of such substances are esters of betaine halides which, as in the case of the sulphate and phosphate substances described above, may be either pure substances or mixtures, depending upon the manner in which they are produced. The specific manner in which the given nitrogenous substance is produced depends upon the materials at hand and the final product desired. A convenient method which can be used, for example when a substance like the cetyl ester of betaine chloride is to be formed, is to dissolve or suspend cetyl chloracetate in a solvent such as toluene and treat the same with trimethylamine dissolved in methyl alcohol, using a tightly closed vessel to prevent escape of volatile ingredients. The reaction mixture may be allowed to stand for several days at room temperature, after which the cetyl ester of betaine chloride will separate out. Similar methods may be employed for treating all nitrogenous substances in which the nitrogenous group is in the form of a quaternary amine. An alcohol such as a monovalent alcohol, or a polyvalent alcohol in which one hydroxy group is esterified with the fatty acid group as, for example, in the case of monopalmitin, is treated with chloracetic acid or bromacetic acid to form an ester at one of the remaining hydroxy groups. The resulting product is then dissolved in a suitable solvent and reacted with an amine such as trimethylamine. The reaction may be allowed to continue for as long as several days at room temperature or for a shorter time at an elevated temperature, in which case a reflux or autoclave is used to prevent the escape of volatile constituents.

The general method described above may be used to form mixed nitrogenous substances from the mixed mono- and di-esters of glycerine and polyglycerols prepared according to methods heretofore described. For example, a mixture of mono- and diglycerides can be treated with chloracetic acid to form a mixture of chloracetic acid esters and these reacted with an amine to produce a mixture of quaternary ammonium compounds.

As in the case of sulphate, phosphate and sulphonic acid derivatives described hereinabove, many of the nitrogenous substances possess anti-spattering action when employed in margarine. Those substances which have anti-spattering action offer marked advantages when used in egg material whether frozen or unfrozen, particularly when such egg materials are employed as emulsifying agents in the production of emulsions such as cake batters.

In selecting nitrogenous substances, care should be taken to employ only those which under normal conditions incident to the manufacture, storage and use of the egg product, will not spoil and liberate objectionable amines which would produce an offensive taste and/or odor. We have found that if the choline linkage referred to in prior Harris Patent No. 1,917,252 is avoided, nitrogenous products can be used to advantage, whether they are of an anti-spattering nature or not, providing they have lipophile groups and are sufficiently hydrophillic, or have a group of sufficiently hydrophillic nature to function in the manner herein described in the cake material.

Although the preceding disclosure is believed to be ample to teach those skilled in the art the classes of substances used in our invention and to suggest readily to the skilled chemist individual substances coming within the various subclasses, we list below typical illustrative examples which may be used with good results:

$CH_3-(CH_2)_{10}-CH_2-O-S(=O)(ONa)=O$   Dodecyl sodium sulphate $CH_3-(CH_2)_{14}-CH_2-O-S(=O)(ONa)=O$   Hexadecyl sodium sulphate $C_{27}H_{45}O-S(=O)(ONa)=O$   Cholesteryl sodium sulphate $C_{17}H_{35}-C(=O)-O-CH_2-CHOH-CH_2-O-S(=O)(ONa)=O$   Monostearin sodium sulphate $\begin{array}{l} H_2C-O-C(=O)-C_{15}H_{31} \\ H-C-O-S(=O)(ONa)=O \\ H_2C-O-C(=O)-C_{15}H_{31} \end{array}$   Dipalmitin sodium sulphate $C_{13}H_{27}-C(=O)-O-CH_2-CHOH-CH_2-O-CH_2-CHOH-CH_2O-S(=O)(=O)-ONa$   Monomyristyl diglycerol sulphate (sodium salt)

$CH_3(CH_2)_{10}-CH_2-O-CH_2-CHOH-CH_2-O-S(=O)(=O)-ONa$   Dodecyl glycerol ether sulphate (sodium salt)

$CH_3-(CH_2)_{16}-CH_2-O-CH_2-CH_2-O-CH_2-CH_2-O-S(=O)(=O)-ONa$   Octodecyl diethyleneglycol ether sulphate (sodium salt)

$C_{17}H_{35}-C(=O)-O-CH_2-CH(O-S(=O)(=O)-ONa)-C(=O)-ONa$   Monostearyl glyceric acid sulphate (sodium salt)

$C_{17}H_{33}-C(=O)-O-CH_2-(CHOH)_4-CH_2-O-S(=O)(=O)-ONa$   Mono-oleyl sorbitol sulphate (sodium salt)

$\begin{array}{l} CH_3-(CH_2)_6-CH_2-O \\ CH_3-(CH_2)_6-CH_2-O \end{array} P(=O)(ONa)$   Dioctyl sodium phosphate $CH_3-(CH_2)_{12}-CH_2-O-P(=O)(ONa)_2$   Tetradecyl disodium phosphate $C_{17}H_{35}-\overset{O}{\overset{\|}{C}}-CH_2-CHOH-CH_2-O-\overset{O}{\overset{\|}{P}}(-ONa)-ONa$ Monostearin disodium phosphate $C_{17}H_{33}-\overset{O}{\overset{\|}{C}}-O-CH_2-CHOH-CH_2-O-CH_2-CHOH-CH_2-O-\overset{O}{\overset{\|}{P}}(-ONa)-ONa$ Mono-oleyl diglycerol phosphate (sodium salt)

$CH_3-(CH_2)_{14}-CH_2-O-CH_2-CHOH-CH_2-O-\overset{O}{\overset{\|}{P}}(-ONa)-ONa$ Hexadecyl glycerol ether phosphate (sodium salt)

$CH_3-(CH_2)_{10}-CH_2-O-CH_2-CH_2-O-CH_2-CH_2-O-\overset{O}{\overset{\|}{P}}(-ONa)-ONa$ Dodecyl diethylene-glycol ether phosphate (sodium salt)

$C_{17}H_{33}-\overset{O}{\overset{\|}{C}}-O-CH_2-(CHOH)_4-CH_2-O-\overset{O}{\overset{\|}{P}}(-ONa)-ONa$ Mono-oleyl mannitol phosphate (sodium salt)

$C_{15}H_{31}-\overset{O}{\overset{\|}{C}}-O-CH_2-CH_2-\overset{O}{\overset{\|}{S}}(=O)-ONa$ Beta-hydroxyethanesulphonic acid palmitate (sodium salt)

$C_{18}H_{37}-\overset{O}{\overset{\|}{S}}(=O)-ONa$ Octadecane sulphonic acid (sodium salt)

$CH_3-(CH_2)_{14}-CH_2-O-CH_2-CH_2-O-CH_2-CH_2-\overset{O}{\overset{\|}{S}}(=O)-ONa$ $C_{16}H_{33}-O-\overset{O}{\overset{\|}{C}}-CH_2-\overset{O}{\overset{\|}{S}}(=O)-ONa$ Hexadecyl sulphoacetate (sodium salt)

$C_{17}H_{35}-\overset{O}{\overset{\|}{C}}-O-CH_2-CHOH-CH_2-O-\overset{O}{\overset{\|}{C}}-CH_2-\overset{O}{\overset{\|}{S}}(=O)-ONa$ Monostearin sulphoacetate (sodium salt)

$C_{16}H_{33}-O-CH_2-CHOH-CH_2-O-\overset{O}{\overset{\|}{C}}-CH_2-\overset{O}{\overset{\|}{S}}(=O)-ONa$ Hexadecyl glycerol ether sulphoacetate (sodium salt)

$C_{15}H_{31}-\overset{O}{\overset{\|}{C}}-O-CH_2-(CHOH)_4-CH_2-O-\overset{O}{\overset{\|}{C}}-CH_2-\overset{O}{\overset{\|}{S}}(=O)-ONa$ Monopalmityl sorbitol sulphoacetate (sodium salt)

$C_{17}H_{35}-\overset{O}{\overset{\|}{C}}-O-CH_2-CHOH-CH_2-O-CH_2-CHOH-CH_2-O-\overset{O}{\overset{\|}{C}}-CH_2-\overset{O}{\overset{\|}{S}}(=O)-ONa$ Monostearyl diglycerol sulphoacetate (sodium salt)

$CH_3-(CH_2)_{13}-CH_2-\overset{O}{\overset{\|}{S}}(=O)-ONa$ Tetradecane sulphonic acid (sodium salt)

Stearyl creatinine (sodium salt).
Stearyl glutamic acid, $C_{17}H_{35}-\overset{O}{\overset{\|}{C}}-\overset{H}{\overset{|}{N}}-CH(-O=C-OH)-CH_2-CH_2-\overset{O}{\overset{\|}{C}}-OH.$ Stearyl peptone.
Palmityl leucine, $C_{15}H_{31}-\overset{O}{\overset{\|}{C}}-NH-CH(-O=C-OH)-CH_2-CH(CH_3)-CH_3.$ Cholesteryl ester of betaine chloride, $C_{17}H_{35}-O-\overset{O}{\overset{\|}{C}}-CH_2-N(-Cl)(-CH_3)(-CH_3)-CH_3$ $C_{17}H_{35}-\overset{O}{\overset{\|}{C}}-O-CH_2-\overset{OH}{\overset{|}{CH}}-CH_2-O-\overset{O}{\overset{\|}{C}}-CH_2-N(-Cl)(-CH_3)(-CH_3)-CH_3$ Melissyl dimethyl-aminoacetate hydrochloride, $C_{30}H_{61}-O-\overset{O}{\overset{\|}{C}}-CH_2-N(CH_3)(CH_3)-HCl$ Cetyl ester of betaine chloride.
Melissyl ester of betaine chloride.
Cholesteryl dimethyl-aminoacetate hydrochloride $C_{27}H_{45}-O-\overset{O}{\overset{\|}{C}}-CH_2-\overset{CH_3}{\overset{|}{\underset{H}{N}}}(-Cl)-CH_3$ Cetyl ester of dimethylaminoacetic acid hydrochloride $C_{16}H_{33}-O-\overset{O}{\overset{\|}{C}}-CH_2-\overset{CH_3}{\overset{|}{\underset{Cl}{N}}}(-H)-CH_3$ While the illustrative examples represent single substances, in general, it is advantageous in practice to prepare and employ mixtures. Methods of preparation resulting in suitable mixtures of substances have been given.

In treating eggs, the meat is removed from the shell and all eggs discarded which are unfit for edible purposes. About 140 pounds of the mixed whole eggs are introduced into a large container fitted with a mixing device and about ten pounds of mixed fatty acid glycerol ester sulphates produced in accordance with the example given hereinabove are added with constant stirring until a homogeneous mixture is obtained. As another example, the sulphate material may first be incorporated with a relatively small amount of the egg material to form a paste, and this paste then emulsified in with the rest of the egg material, using constant stirring or mixing.

The invention can be carried on by varying the amount of whites in the egg mixture. Thus for example, we can use more whites or less whites, or the whites or yolks may be used alone with a suitable proportion, say from 1 to 10% of the material of our invention. The product produced in any one of the examples given above may be placed in cans, refrigerated, or frozen, and kept in a refrigerated or frozen condition until ready for use.

The egg material of the present invention is particularly advantageous in the preparation of cake batters. By using egg material in which our products have been incorporated, a larger amount of moisture such as milk and a greater proportion of sugar can be used without increasing the amount of egg yolk, with no impairment to the volume of the cake when baked, but with a decided improvement in tenderness and general texture. The keeping qualities of the cake are also greatly improved.

Although our invention is not limited to use with materials having the effect of reducing the spattering of margarine during frying, anti-spattering agents of the class described in Harris Patent No. 1,917,256, are of very great value. Hydrophillic materials in which the lipophile and hydrophile groups are not in such a state of balance as to prevent spattering but which have the character of hydrophillic lipins described, in many cases impart substantially as desirable functions as the anti-spattering agents.

Throughout this specification, as well as in the appended claims, we have employed the term "poly" to denote more than one.

What we claim as new and desire to protect by Letters Patent of the United States is:

1. A composition consisting essentially of egg material, and a proportion of a higher fatty acid ester of a polyhydroxy substance wherein said ester has at least one hydroxy group, the hydrogen of which is replaced by a hydrophillic radical of a class consisting of sulphate, phosphate, sulphonic acid and hydrophillic nitrogenous radicals, devoid of choline, and innocuous salts thereof.

2. A composition consisting essentially of egg material, and a proportion of a non-nitrogenous substance having balanced lipophile and hydrophile groups capable of reducing the spattering of margarine when incorporated therein.

3. A composition consisting essentially of egg material and a proportion of a hydrophillic higher fatty acid ester of a polyhydroxy substance of a class consisting of alcohols, sugars and hydroxy-carboxylic acids, said ester having at least one hydroxy group, the hydrogen of which is replaced by a hydrophillic radical of a class consisting of sulphate, phosphate, sulphonic acid and nitrogenous radicals, devoid of choline, and innocuous salts thereof.

4. A composition consisting essentially of egg material and a proportion of a relatively high molecular weight fatty acid ester of glycerine containing at least one hydroxy group, the hydrogen of which is replaced by a hydrophillic radical of a class consisting of sulphate, phosphate, sulphonic acid and hydrophillic nitrogenous radicals, devoid of choline, and innocuous salts thereof.

5. A composition consisting essentially of egg material and a proportion of a relatively high molecular weight fatty acid ester of a polyglycerol containing at least one hydroxy group, the hydrogen of which is replaced by a hydrophillic radical of a class consisting of sulphate, phosphate, sulphonic acid and hydrophillic nitrogenous radicals, and innocuous salts thereof.

6. A composition consisting essentially of egg material and a hydrophillic substance comprising sulfuric acid esters of higher molecular weight fatty acid polyglycerides prepared by re-esterifying a mixture of polyglycerols with an oleaginous material of a class consisting of oils, fats and waxes, and sulphating the resulting product.

7. A composition consisting essentially of egg material, and a proportion of a higher fatty acid ester of a polyhydroxy substance wherein said ester has at least one hydroxy group, the hydrogen of which is replaced by a hydrophillic radical of a class consisting of sulphate, phosphate, sulphonic acid and hydrophillic nitrogenous radicals, devoid of choline, and innocuous salts thereof, said composition being frozen and maintained in a frozen condition until ready for use.

8. A composition consisting essentially of egg material, and a proportion of a non-nitrogenous substance having balanced lipophile and hydrophile groups capable of reducing the spattering of margarine when incorporated therein, said composition being frozen and maintained in a frozen condition until ready for use.

9. A frozen egg product consisting essentially of egg material and a proportion of a higher fatty acid ester of a polyhydroxy substance wherein said ester has at least one hydroxy group, the hydrogen of which is replaced by a hydrophillic radical of a class consisting of sulphate, phosphate, sulphonic acid, and hydrophillic nitrogenous radicals, devoid of choline, and innocuous salts thereof.

10. A frozen egg product consisting essentially of egg material and a proportion of a higher fatty acid ester of a polyhydric alcohol, said ester having at least one hydroxy group, the hydrogen of which is replaced by a hydrophillic radical of a class consisting of sulphate, phosphate, sulphonic acid and hydrophillic nitrogenous radicals, devoid of choline, and innocuous salts thereof.

11. A frozen egg product consisting essentially of egg material and a proportion of a relatively high molecular weight fatty acid ester of glycerine containing at least one hydroxy group, the hydrogen of which is replaced by a hydrophillic radical of a class consisting of sulphate, phosphate, sulphonic acid and hydrophillic nitrogenous radicals, devoid of choline, and innocuous salts thereof.

12. A frozen egg product consisting essentially of egg material and a proportion of a relatively high molecular weight fatty acid ester of polyglycerol containing at least one hydroxy group, the hydrogen of which is replaced by a hydrophillic radical of a class consisting of sulphate, phosphate, sulphonic acid and hydrophillic nitrogenous radicals, and innocuous salts thereof.

13. A frozen egg product consisting essentially of egg material and a proportion of a non-nitrogenous substance having balanced lipophile and hydrophile groups and capable of reducing the spattering of margarine when incorporated therein.

14. A frozen egg product consisting essentially of egg material and a hydrophillic substance having a lipophile group and a nitrogenous hydrophile group devoid of a choline linkage.

15. A frozen egg product consisting essentially of egg material consisting essentially of egg white and a proportion of a higher fatty acid ester of a polyhydroxy substance wherein said ester has at least one hydroxy group, the hydrogen of which is replaced by a hydrophillic radical of a class consisting of sulphate, phosphate, sulphonic acid and hydrophillic nitrogenous radicals, devoid of choline, and innocuous salts thereof.

16. A frozen egg product consisting essentially of egg material consisting essentially of egg white and a proportion of a non-nitrogenous substance having balanced lipophile and hydrophile groups capable of reducing the spattering of margarine when incorporated therein.

17. A composition consisting essentially of egg material and a substance having lipophile and hydrophile groups, said substances comprising a derivative of a chemical substance having a hydroxy radical attached to a relatively high molecular weight lipophile group, wherein the hydrogen of the hydroxy group is replaced by a hydrophile radical of a class consisting of sulphates, phosphates, sulphonic acid derivatives, and quaternary ammonium radicals devoid of choline, and innocuous salts thereof.

18. A composition consisting essentially of egg material and a proportion of an alkyl sulphate salt the alkyl radical of which is of relatively high molecular weight.

19. A composition consisting essentially of egg material and a proportion of an alkyl phosphate salt the alkyl radical of which is of relatively high molecular weight.

20. A composition consisting essentially of egg material and a proportion of a substance of a class wherein the hydroxy hydrogen of a relatively high molecular weight aliphatic alcohol is replaced by a hydrophile group of a class consisting of sulphates, phosphates, sulphonic acid derivatives, and quaternary ammonium radicals devoid of choline, and innocuous salts thereof.

BENJAMIN R. HARRIS.
MARVIN C. REYNOLDS.